US011854417B2

(12) United States Patent
Hiddai et al.

(10) Patent No.: US 11,854,417 B2
(45) Date of Patent: *Dec. 26, 2023

(54) METHOD AND SYSTEM FOR CALCULATING AND PRESENTING TERRAIN-CLEARANCE REACHABLE REGIONS

(71) Applicant: ELBIT SYSTEMS LTD., Haifa (IL)

(72) Inventors: Sharon Hiddai, Haifa (IL); Judith Zelicovici, Haifa (IL); Jacob Avinu, Haifa (IL); Eyal Ziv, Haifa (IL); Yana Zohar, Haifa (IL); Yonathan Mizrahi, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/008,224

(22) Filed: Aug. 31, 2020

(65) Prior Publication Data

US 2020/0402413 A1 Dec. 24, 2020

Related U.S. Application Data

(63) Continuation of application No. 15/579,244, filed as application No. PCT/IL2016/050564 on Jun. 2, 2016, now Pat. No. 11,176,837.

(51) Int. Cl.
*G08G 5/04* (2006.01)
*G01C 21/20* (2006.01)
(Continued)

(52) U.S. Cl.
CPC ........... *G08G 5/045* (2013.01); *G01C 21/005* (2013.01); *G01C 21/20* (2013.01); *G08G 5/0021* (2013.01);
(Continued)

(58) Field of Classification Search
CPC ............ G06T 2200/00; G06T 2200/04; G06T 2200/08; G06T 2200/24; G06T 2200/28;
(Continued)

(56) References Cited

U.S. PATENT DOCUMENTS

| 5,086,396 | A | * | 2/1992 | Waruszewski, Jr. .... F41G 7/343 701/458 |
| 5,504,686 | A | * | 4/1996 | Lippitt ................. G05D 1/0646 701/533 |

(Continued)

FOREIGN PATENT DOCUMENTS

| EP | 2037339 | 3/2009 |
| FR | 2860292 | 4/2005 |
| WO | WO 2007/133475 | 11/2007 |

OTHER PUBLICATIONS

Office Action for U.S. Appl. No. 15/579,244, dated Oct. 26, 2020.
(Continued)

*Primary Examiner* — Anthony R Jimenez
(74) *Attorney, Agent, or Firm* — PEARL COHEN ZEDEK LATZER BARATZ LLP

(57) ABSTRACT

A method and a system are provided herein for calculating whether or not a specific aerial vehicle at a specified point of time can maneuver over a given location in the terrain while complying with terrain clearance requirements. The system may include a computer memory configured to store a 3D model representing at least a portion of a terrain located in a vicinity of an aerial vehicle; a computer processor configured to map said portion of the terrain into at least two types: a first type indicative of a potential of the aerial vehicle to maneuver over a respective terrain while complying with terrain clearance, and a second type indicative of a non-potential of said aerial vehicle to maneuver over a respective terrain, wherein the mapping is carried out based on said parameters, the 3D model and given predefined performance of the aerial vehicle.

20 Claims, 7 Drawing Sheets

(51) Int. Cl.
  *G08G 5/00* (2006.01)
  *G09B 29/12* (2006.01)
  *G01C 21/00* (2006.01)

(52) U.S. Cl.
  CPC ......... *G08G 5/0052* (2013.01); *G08G 5/0086* (2013.01); *G08G 5/0091* (2013.01); *G09B 29/12* (2013.01)

(58) Field of Classification Search
  CPC ... G06T 2200/36; G06T 19/00; G06T 19/003; G06T 19/006; G06T 15/04; G06T 1/00; G06T 1/0007; G06T 7/00; G06T 7/10; G06T 7/246; G06T 7/40; G06T 17/00; G06T 17/05; G06T 17/20; G06T 17/30; G09B 29/12; G01C 3/00; G01C 3/02; G01C 5/00; G01C 11/00; G01C 11/02; G01C 11/04; G01C 11/30; G01C 21/00; G01C 21/20; G01C 21/005; G01C 21/30; G01C 21/34; G01C 21/36; G01C 23/00; G08G 5/04; G08G 5/045; G08G 5/0086; G08G 5/0021; G08G 5/0091; G08G 5/0052
  USPC .......................................................... 701/4
  See application file for complete search history.

(56) References Cited

U.S. PATENT DOCUMENTS

| | | | |
|---|---|---|---|
| 5,884,223 A | 3/1999 | Tognazzini | |
| 7,095,488 B2 | 8/2006 | Jamieson et al. | |
| 7,352,292 B2 * | 4/2008 | Alter | G01C 23/00 340/945 |
| 8,234,020 B1 | 7/2012 | Wichgers et al. | |
| 8,296,056 B2 * | 10/2012 | Becker | G01S 17/86 701/408 |
| 8,543,265 B2 * | 9/2013 | Ekhaguere | G08G 5/0021 701/423 |
| 8,660,338 B2 * | 2/2014 | Ma | G06T 7/593 382/154 |
| 11,176,837 B2 * | 11/2021 | Hiddai | G08G 5/0021 |
| 2004/0160341 A1 | 8/2004 | Feyereisen et al. | |
| 2004/0181318 A1 | 9/2004 | Redmond et al. | |
| 2006/0004497 A1 | 1/2006 | Bull | |
| 2007/0027588 A1 | 2/2007 | Astruc et al. | |
| 2007/0031007 A1 | 2/2007 | Bitar | |
| 2007/0150117 A1 | 6/2007 | Bitar et al. | |
| 2007/0247336 A1 | 10/2007 | Morizet et al. | |
| 2007/0265776 A1 | 11/2007 | Hugues et al. | |
| 2008/0046171 A1 | 2/2008 | Bitar et al. | |
| 2008/0174454 A1 | 7/2008 | Bitar et al. | |
| 2010/0023264 A1 | 1/2010 | G. | |
| 2011/0148866 A1 | 6/2011 | Chu et al. | |
| 2013/0090787 A1 | 4/2013 | Ryu et al. | |
| 2014/0074324 A1 | 3/2014 | Burgin et al. | |

OTHER PUBLICATIONS

Office Action for EP Patent Application No. 16802690.4, dated Nov. 10, 2021.
International Search Report and Written Opinion of PCT Application No. PCT/IL2016/050564, dated Sep. 26, 2016.
Office action for U.S. Appl. No. 15/579,244, dated Jul. 25, 2019.
Extended European Search Report for EP Application No. 16802690.4, dated Apr. 12, 2019.

* cited by examiner

300A

```
┌─────────────────────────────────────────────┐
│  OBTAINING A 3D MODEL REPRESENTING A        │
310A ─│  PORTION OF A TERRAIN LOCATED RELATIVE      │
│         TO AN AERIAL VEHICLE                │
└─────────────────────────────────────────────┘
                      │
┌─────────────────────────────────────────────┐
320A ─│    OBTAINING A PLURALITY OF PARAMETERS      │
│  AFFECTING THE MANEUVERABILITY OF THE AERIAL│
└─────────────────────────────────────────────┘
                      │
┌─────────────────────────────────────────────┐
│   MAPPING THE PORTION OF THE TERRAIN INTO   │
│  AT LEAST TWO TYPES: A FIRST TYPE INDICATIVE│
│    OF AN ABILITY OF THE AERIAL VEHICLE TO   │
│  MANEUVER OVER A RESPECTIVE TERRAIN WHILE   │
330A ─│   COMPLYING WITH TERRAIN CLEARANCE, AND A   │
│   SECOND TYPE INDICATIVE OF A NON- ABILITY  │
│   OF THE AERIAL VEHICLE TO MANEUVER OVER    │
│            A RESPECTIVE TERRAIN             │
└─────────────────────────────────────────────┘
```

310B — OBTAINING A 3D MODEL REPRESENTING AT LEAST A PORTION OF A TERRAIN LOCATED BELOW AN AERIAL VEHICLE

320B — MAPPING THE PORTION OF THE TERRAIN INTO AT LEAST TWO TYPES: A FIRST TYPE INDICATIVE OF AN ABILITY OF THE AERIAL VEHICLE TO MANEUVER OVER A RESPECTIVE TERRAIN, AND A SECOND TYPE INDICATIVE OF A NON-ABILITY OF THE AERIAL VEHICLE TO MANEUVER OVER A RESPECTIVE TERRAIN WHILE COMPLYING WITH TERRAIN CLEARANCE

330B — PRESENTING THE AT LEAST TWO TYPES OF TERRAIN TO A USER IN A FORM OF VISUAL INDICATORS SO THE AT LEAST FIRST TYPE AND THE SECOND TYPE OF TERRAIN ARE VISUALLY DISTINGUISHABLE FROM EACH OTHER

Figure 3B

METHOD AND SYSTEM FOR CALCULATING AND PRESENTING TERRAIN-CLEARANCE REACHABLE REGIONS

CROSS-REFERENCE TO RELATED APPLICATIONS

This application is a continuation of U.S. patent application Ser. No. 15/579,244, filed on Dec. 4, 2017, which is a US national stage of PCT Patent Application No. PCT/IL2016/050564, filed on Jun. 2, 2016, which claimed priority from Israeli Patent Application No. 239148, filed on Jun. 2, 2015, all of which are incorporated herein by reference in their entireties.

FIELD OF THE INVENTION

The present invention relates generally to the field of flight support systems, and more particularly to calculating and presenting terrain-related data.

BACKGROUND OF THE INVENTION

Prior to setting forth the background of the invention, it may be helpful to set forth definitions of certain terms that will be used hereinafter.

The term 'terrain' as used herein is broadly defined as the surface of the ground as presented by the topography, any object that is located on the topography such as buildings and trees as well as obstacles such as antennas and poles.

The term 'terrain clearance' as used herein is defined as an altitude above surface that complies with predefined safety regulations. A specific location over a surface is said to have terrain clearance if an aerial vehicle can safely pass over it according to predefined safety envelope. Terrain-clearance should be interpreted herein broadly to also include obstacle-clearance.

The term 'terrain-clearance reachable region' as used herein is defined as a region above the terrain to which it is possible to maneuver above while complying with predefined terrain clearance requirements.

The term "region of interest" as used herein relates to a subset of the air space that, for example, is located within a predefined radius from the aerial vehicle or alternatively, a flight corridor which is defined by a planned path of flight with predefined margins denoting possible maneuvers.

One of the challenges pilots of aerial vehicles need to address is how to assess the potential or the ability of the aerial vehicle they are controlling to safely pass or maneuver over specific regions along the flight corridor. FIG. 1 illustrates a view according to the prior art which provides a pilot with a visual indication of the altitude of the terrain relative to the aerial vehicle 12 he or she controls. Specifically, 40A and 40B are above the altitude of aerial vehicle 12, portions 30A and 30B has similar altitude as the aerial vehicle and 20A and 20B are below the flight elevation. As can be seen, portions at the flight corridor that are located above the altitude of the aerial vehicle are assigned with a first visual indicator (e.g. first color), portions of the terrain that are located below the aerial vehicle are assigned with a different visual indicator distinguishable from the first visual indicator. All in all, two or more different visual indicators are used in order to mark the terrain altitude relative to the aerial vehicle.

One clear drawback of the aforementioned prior art is, for example, when flying along a canyon below mountains height, all mountains top will be presented by a visual indicator (e.g. red color) thus not giving any indication on what is the real ability to maneuver over the mountain tops.

It would be therefore advantageous to provide and present data that takes into account the aerial vehicle data, both real-time kinematic data and performance envelope, and determine which portions along the flight corridor are realistically maneuverable for the aerial vehicle while complying with terrain clearance requirements.

SUMMARY OF THE INVENTION

Some embodiments of the present invention provide a method of calculating whether or not a specific aerial vehicle at a specified point of time can maneuver over a given location in the terrain. The system may include a computer memory configured to store a 3D model representing at least a portion of a terrain located below an aerial vehicle; a plurality of sensors configured to obtain real-time parameters relating to the aerial vehicle and its environment as well as other parameters (either real-time or not real-time) that may affect the maneuverability of the aerial vehicle; and a computer processor configured to map said portion of the terrain into at least two types: a first type indicative of an ability of said aerial vehicle to maneuver over a respective terrain, and a second type indicative of a non-ability to maneuver over a respective terrain, wherein the mapping is carried out based on any of the aforementioned parameters, and given a predefined performance envelope of the aerial vehicle.

Some other embodiments of the present invention provide a system of visualizing the aforementioned mapping. The visualization system may include a computer memory configured to store a 3D model representing at least a portion of a terrain located in the vicinity of an aerial vehicle; a computer processor configured to map said portion of the terrain into at least two types: a first type indicative of an ability of said aerial vehicle to maneuver over a respective terrain while complying with terrain clearance, and a second type indicative of a non-ability to maneuver over a respective terrain, wherein the mapping is carried out based on said real-time parameters, and given a predefined performance envelope of the aerial vehicle. The system may include a display configured to present the at least two types of terrain to a user in a form of visual indicators so the at least first type and the second type of terrain are visually distinguishable from each other.

BRIEF DESCRIPTION OF THE DRAWINGS

The subject matter regarded as the invention is particularly pointed out and distinctly claimed in the concluding portion of the specification. The invention, however; both as to organization and method of operation, together with objects, features, and advantages thereof, may best be understood by reference to the following detailed description when read with the accompanying drawings in which:

FIGS. 3A and 3B are flowchart diagrams illustrating methods in accordance with embodiments of the present invention;

Figure 1:
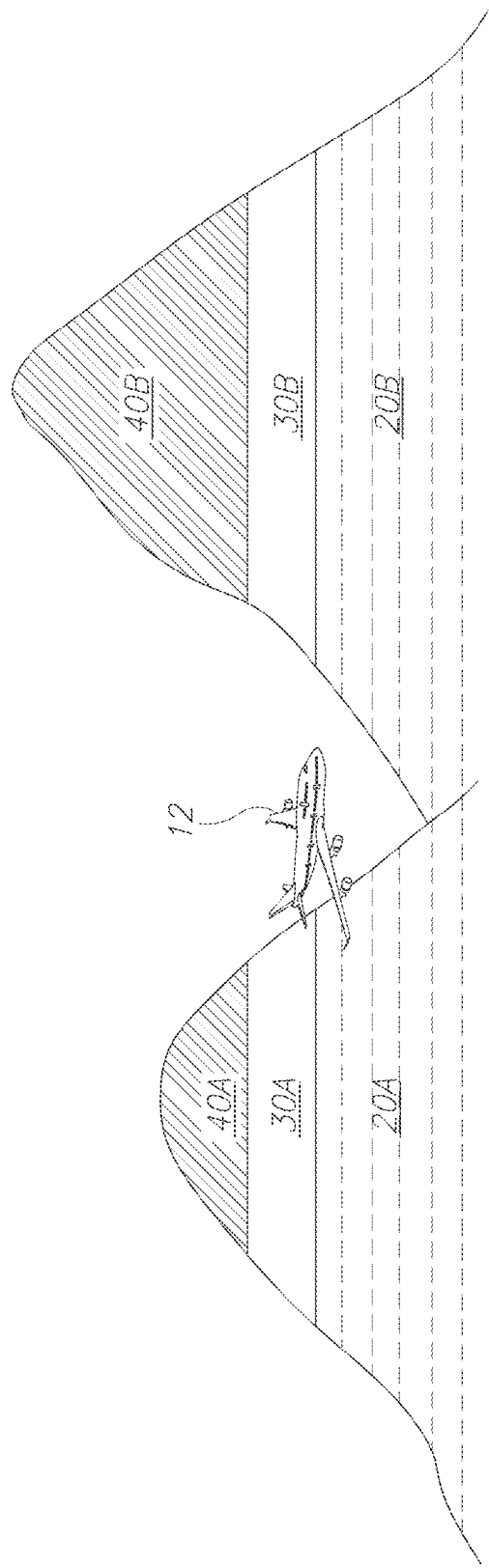
FIG. 1 is an exemplary visual indication showing surface altitude relative to altitude of the aerial vehicle, in accordance with the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention receive as an input at least the following inputs:
1) Aerial vehicle parameters (real-time measured metrics affecting maneuverability)
2) Aerial vehicle performance (derived from type of platform)
3) Terrain data (3D model of the terrain in the vicinity of the aerial vehicle)
4) Height clearance (safety requirements relating to aerial vehicle altitude vs. terrain)

The aforementioned inputs, possibly with additional inputs of different types, are then applied to a computer processor that is configured for calculating a mapping of the terrain to portions which can be maneuvered above while complying with terrain clearance. Alternatively, the mapping may include also the portions that cannot be maneuvered above. In some embodiments the mapping may be further visualized and presented as will be described in further detail below.

Figure 2A:
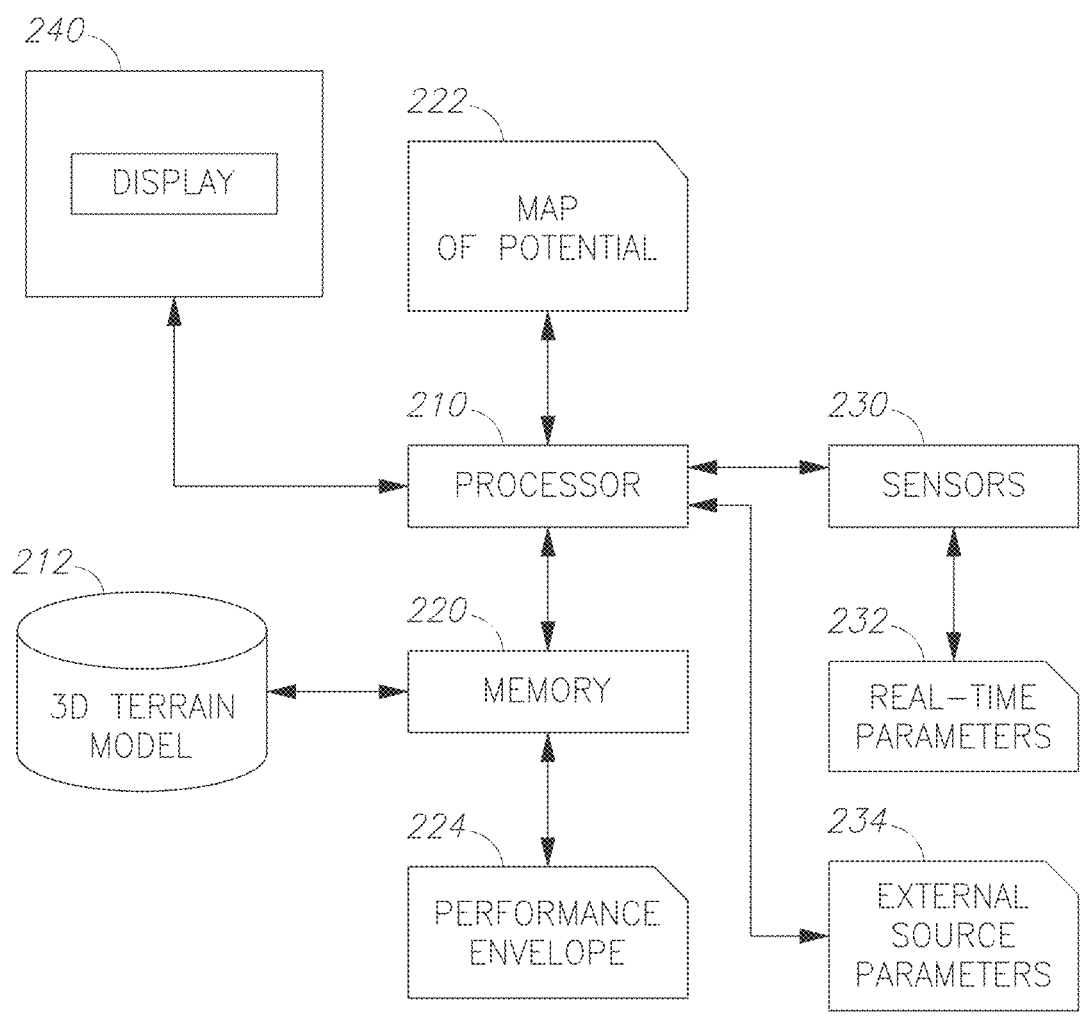
FIGS. 2A and 2B are block diagrams illustrating non-limiting exemplary architectures of a system in accordance with embodiments of the present invention.

FIG. 2A is a block diagram illustrating an exemplary architecture on which embodiments of the present invention may be implemented. System 200 may include a computer memory 220 configured to store a plurality of data that may affect the maneuverability of the aerial vehicle (described in more details hereinafter). Additionally, memory 220 may store a 3D model 212 representing at least a portion of a terrain located within a specified (possibly dynamic) range from the aerial vehicle.

Exemplary terrain models which may serve as basis for 3D model 212 may include Digital Terrain Elevation Data (DTED) and Digital Terrain Mapping (DTM) that may be provided from a third party source. Alternatively, the terrain data may be captured or derived in real time using one or more sensors located on board of the aerial vehicle for generating real time mapping of terrain data. Additionally, the captured images of the terrain may be used to compare with data derived from the DIED or the DTM for producing a combined 3D model.

A plurality of sensors 230 (described in more detail hereinafter) may be configured to obtain real-time parameters 232 of various types and sources that may affect the maneuverability of the aerial vehicle. These real-time parameters may be related to the scene (e.g. weather, temperature) or the aerial vehicle (speed, altitude) and combination thereof (the planned and predicted path based on current data).

System 200 may further include a computer processor 210 configured to generate a map of potential 222 which is a mapping of a portion of the terrain into at least two types: a first type indicative of an ability of said aerial vehicle to maneuver over a respective terrain while complying with predefined terrain clearance requirements, and a second type indicative of a non-ability to maneuver over a respective terrain while complying with the same predefined terrain clearance requirements.

The mapping may be carried out by applying the aforementioned real-time parameters 232, and any other off-line data that may affect the maneuverability stored on memory 220 to a decision function executed by computer processor 210. The decision function may take into account the 3D model of the relevant portion of the terrain and applies the performance envelope 224 of the aerial vehicle, as well as data from external sources 234 which may be communicated with the aerial vehicle by any wireless communication means (not shown).

The performance envelope 224, also referred to as flight envelope, service envelope, refers to the capabilities of a design in terms of airspeed and load factor or altitude of the specific aerial vehicle. The term is closely related to more modern terms known as extra power and a doghouse plot which are different ways of describing a performance envelope.

A display 240 may be used in order to visualize the map of potential. Such visualization may be achieved by any visual indication such as colors, brightness variance, blinking, flashing of the portions that are reachable while complying with terrain clearance, or alternatively, the portions that are not reachable. In some applications it would be advantageous to focus only on the portions of that are terrain clearance reachable whereas some applications will present only the non-reachable portions. Alternatively, both types of portions will be presented.

Figure 2B:
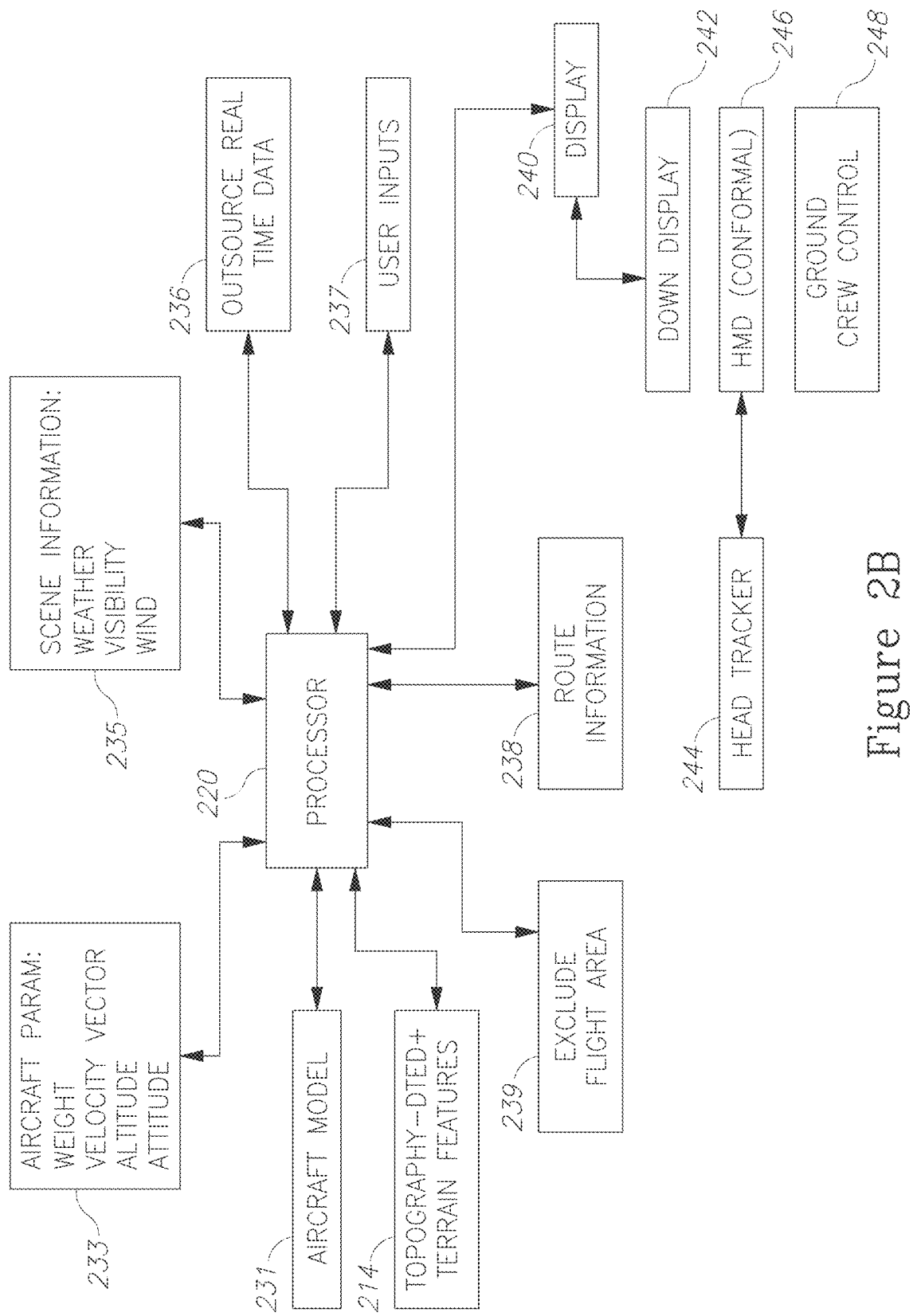

FIG. 2B is a block diagram illustrating in further details the exemplary architecture on which embodiments of the present invention may be implemented. Specifically, the various types of inputs entering computer processor 220 are shown in a more elaborative manner. Some of the parameters that may serve as input may include: topography 214—Digital Terrain Elevation Data (DTED) plus terrain features; aircraft model 231; aircraft parameters 233 such as weight, velocity vector, altitude and attitude; scene information 235 such as weather, visibility, and wind; outsource real-time data 236 which can also be related to weather and temperature; user inputs 237 which may be used to validate data by the user; route information 238; and excluded flight area 239.

Some inputs such as outsource real-time data 236 are used to validate and improve the equality of the data from other sources. Other inputs are used to override the other inputs such as excluded flight area 239 which is mapped to the terrain to reflect that the specified portions of the terrain cannot be maneuvered to while complying with predefined terrain clearance requirements. The excluded flight area data 239 can also be used to reduce the calculations and those areas as the potential of maneuverability to the excluded flight are is no longer affected by the other inputs but rather is an overriding constraint.

According to some embodiments of the present invention, some non-limiting exemplary input parameters are provided herein:

A. Terrain Related:
Terrain elevation (derived from the DTED) in the portion being mapped, based on calculation resolution;
B. Aerial Vehicle Related:
Actual elevation of the aerial vehicle (above sea level);
Temperature outside the aerial vehicle;
Current weight of the aerial vehicle (calculated either based on fuel or projection calculation)
Ground track—current flight direction projected over the ground
Indicated airspeed—derived from a sensor;
Wind vector near the aerial vehicle (size and direction);
C. Safety Related:
Required flight clearance (terrain clearance); and
D. Aerial Vehicle Performance Related:
Performance or flight envelope the ability to climb as a function of elevation, temperature, weight, and horizontal speed (possibly in the form of tables) as well as various tolerance ranges.

Display 240 may be implemented as any type of display, including a touchscreen which will enable the user to provide further input or feedback regarding the terrain-clearance reachable portions. For example, the user may provide his or her input regarding the validity of the presented data from a pilot perspective.

Display 240 may be in the form of a down display 242 on which the mapping is presented. Alternatively it can be a head mounted display (HMD) 246 that, together with a head tracker 244 provided a conformal view of the mapping as an augmented reality layer on the view of the pilot so that specific portions of the terrain are presented in a manner that visually distinguish between terrain portions that can be maneuvered above and those which cannot. Further alternatively or additionally, the display may include a ground crew control display 248 for use of flight controllers and the like.

According to some embodiments of the present invention, the portion of the terrain may be limited to a flight corridor, radius or any other ROI which defines potential flight paths of the aerial vehicle.

According to some embodiments of the present invention, the terrain may include any object and surface defining a ground surface. The broad definition of terrain includes physical obstacles as well as mission related constraint such as landing requirements and the like.

According to some embodiments of the present invention, the aforementioned calculating is being repeated over time after updating the real-time parameters. This will yield a dynamic potential data as the flight evolves.

According to some embodiments of the present invention, the obtaining of the 3D model is achieved by repeatedly capturing images of the terrain from various positions and constructing the 3D model based on the captured images.

According to some embodiments of the present invention, a system and in as in FIG. 2 may be modified for visualizing the aforementioned computation of maneuverability over the terrain is provided. Such a modified system may include: a computer memory configured to store a 3D model representing at least a portion of a terrain located below an aerial vehicle; a computer processor configured to calculate an ability of said aerial vehicle to maneuver over at least one specific location on the terrain, based on real-time parameters related to said aerial vehicle, given a predefined performance envelope of the aerial vehicle; and a display 240 configured to present said ability to a user in a form of visual indicators so that a location on the terrain over which said aerial vehicle can maneuver is visually distinguishable from a location on the terrain over which said aerial vehicle cannot maneuver at a specified point of time.

According to some embodiments of the present invention, the visual distinguishability is achieved by a predefined color map associating a first color to locations over which the aerial vehicle can maneuver and a second color to locations over which the aerial vehicle cannot maneuver.

According to some embodiments of the present invention, the visual indicators associated with maneuverability are confined within a flight corridor associated with the aerial vehicle.

According to some embodiments of the present invention, the visual indicators are in a form of bars having various colors associated with a continuous level of maneuverability associated with respective locations above the terrain.

FIG. 3A is a flowchart diagram illustrating a method in accordance with embodiments of the present invention. method 300A may include: obtaining a 3D model representing at least a portion of a terrain located below an aerial vehicle 310A; obtaining real-time parameters indicative of said aerial vehicle relative to the terrain 320A, and mapping said portion of the terrain into at least two types: a first type indicative of an ability of said aerial vehicle to maneuver over a respective terrain while complying with terrain clearance, and a second type indicative of a non-ability to maneuver over a respective terrain 330A, wherein the mapping is carried out based on said real-time parameters, and given predefined performance of the aerial vehicle.

FIG. 3B is a flowchart diagram illustrating another method in accordance with embodiments of the present invention. method 300B may include: obtaining a 3D model representing at least a portion of a terrain located in a vicinity of an aerial vehicle 310B; mapping said portion of the terrain into at least two types: a first type indicative of an ability of said aerial vehicle to maneuver over a respective terrain while complying with terrain clearance, and a second type indicative of a non-ability to maneuver over a respective terrain 320B; and presenting said at least two types of terrain to a user in a form of visual indicators so the at least first type and the second type of terrain are visually distinguishable from each other 330B. Alternatively, only one of the types is presented.

Figure 4:
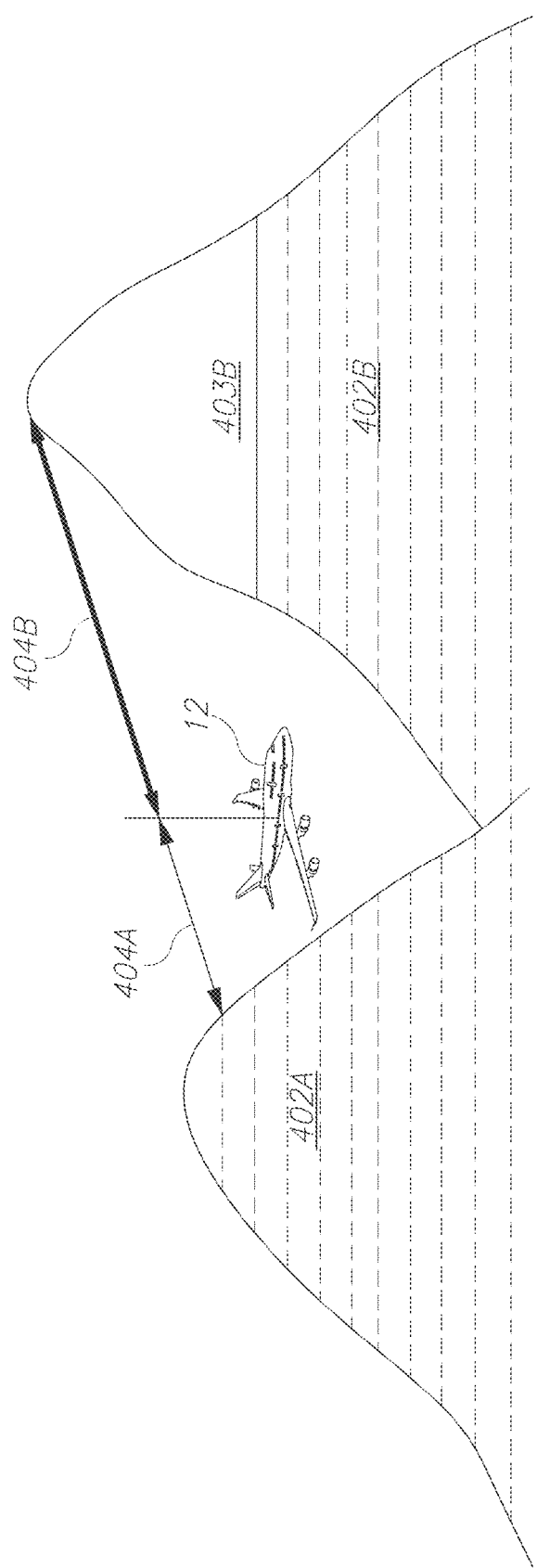
FIG. 4 is an exemplary visual indication showing potential of maneuvering or passing over portions of the terrain, in accordance in accordance with embodiments of the present invention.

FIG. 4 is an exemplary visual indication showing potential of maneuvering or passing over regions in a region of interest, in accordance with embodiments of the present invention. Although it may seem at first similar in appearance to FIG. 1, the content of the different portion is completely different. As opposed to FIG. 1, in visual representation 400 of the terrain, each portion is associated with the potential of the specific vehicle 12 to maneuver over it, given its temporal flight parameters and its performance, in view of the terrain and the terrain clearance constraints.

For example, since aerial vehicle 12 is closer to hill top 402A than hilltop 403, portion 402A is marked by broken horizontal lines indicative of reachability at terrain clearance while hilltop 403B is marked in white indicating non-reachability (schematic route 404B is therefore forbidden). As opposed to the prior art mapping of FIG. 1 some portion of 402A has a higher elevation of 402B which is due to the adaptive nature of the mapping in accordance with embodiments of the present invention.

Advantageously, a pilot or any user such as a flight controller may gain much more information than mere altitude map as the enhanced mapping presented in 400 is based on the actual kinematic constraints of the aerial vehicle. This will enable to reach better decisions and plan the flight in a more realistic manner. For example, the pilot will know that he or she can maneuver above hill-top 402A (along 404A) while complying with terrain clearance requirements although hill-top 402A is located above its current altitude.

Figure 5A:
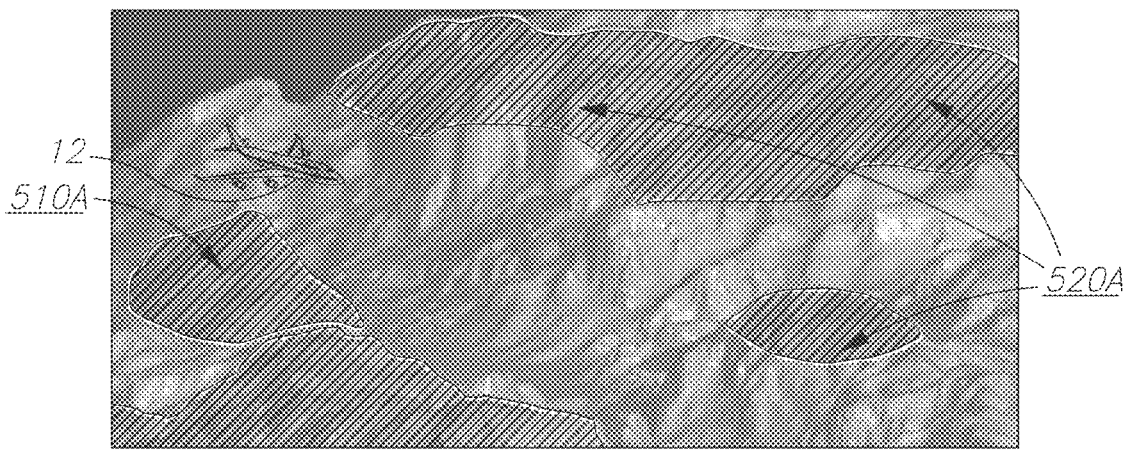
FIG. 5A is exemplary visual appearance presented to a user showing different coloring of terrain based on elevation of the terrain relative to the elevation of the aerial vehicle, in accordance with the prior art.

FIG. 5A is exemplary visual appearance presented to a user showing different coloring of terrain based on elevation of the terrain relative to the elevation of the aerial vehicle, in accordance with the prior art consonant with FIG. 1 discussed above. As can be seen in terrain simulation 500A, all portions of the terrain above a specified elevation (e.g. hilltops) 510A and 520A are colored in the same color which represents portions of the terrain which are merely located above the aerial vehicle 12.

Figure 5B:
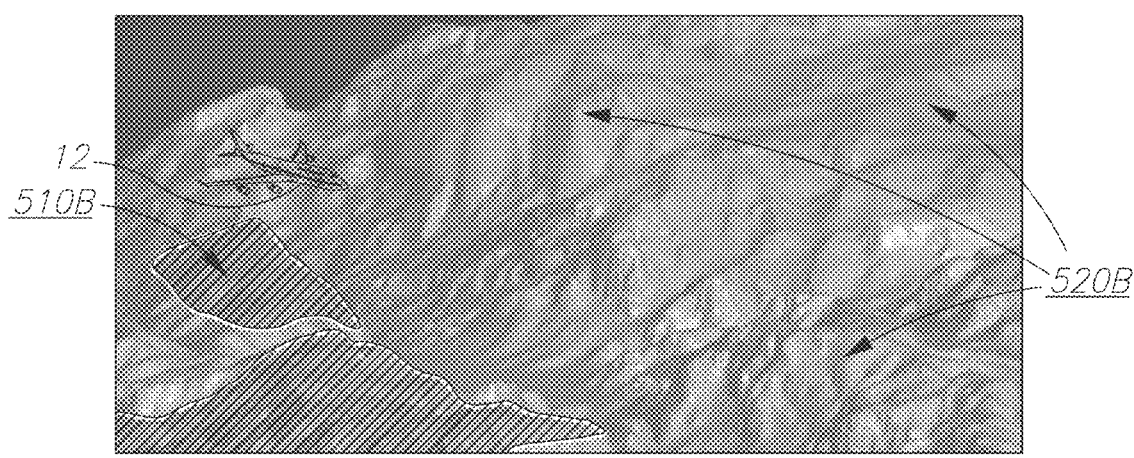
FIG. 5B is exemplary visual appearance presented to a user showing different coloring of terrain based on the potential of maneuver of the aerial vehicle, in accordance with embodiments of the present invention.

FIG. 5B is exemplary visual appearance presented to a user showing different coloring of terrain based on the potential of maneuver of the aerial vehicle, in accordance with embodiments of the present invention consonant with FIG. 4 discussed above. As can be seen in terrain simulation 500θ, while some portions of the terrain above a specified elevation (e.g. hilltops) 510E are colored in a color which represent portions of the terrain which are beyond the potential of the aerial vehicle 12, other portions having same elevation such as 520B have been colored in a different color which represent portions that are within the potential of the aerial vehicle. This is due to the fact that the calculation of the various parameters, those areas can be maneuvered above safely, although they are located above the aerial vehicle. This more sophisticated mapping (as opposed the one shown in FIG. 5A) provides the user more freedom of operation and planning of the flight.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:
1. A method comprising:
obtaining a 3D model representing at least a portion of a terrain located in a vicinity of an aerial vehicle;
obtaining, via a plurality of sensors, real-time parameters affecting a maneuverability of the aerial vehicle; and
mapping said portion of the terrain into at least two types:
a first type indicative of feasibility of said aerial vehicle to maneuver over the portion of the terrain while maintaining terrain clearance, and a second type indicative of unfeasibility of said aerial vehicle to maneuver over the portion of the terrain while maintaining said terrain clearance, wherein the mapping is based on said real-time parameters, said 3D model, and given performance of the aerial vehicle and a potential ability of the aerial vehicle to climb above the portion of the terrain.

2. The method according to claim 1, wherein the real-time parameters comprise are least one of: spatial position, orientation, speed, and acceleration.

3. The method according to claim 1, wherein the portion of the terrain is limited to a flight corridor which defines potential flight paths of the aerial vehicle.

4. The method according to claim 1, wherein the terrain comprises any object and surface defining a ground surface.

5. The method according to claim 1, wherein the obtaining of the 3D model is repeated over time after updating the real-time parameters.

6. The method according to claim 1, wherein the 3D model comprises at least one of: Digital Terrain Elevation Data (DTED), and Digital Terrain Mapping (DTM).

7. A method comprising:
obtaining a 3D model representing at least a portion of a terrain located in a vicinity of an aerial vehicle;
determining portions of the terrain that are feasible to reach by the aerial vehicle while maintaining terrain clearance; and
presenting said terrain clearance reachable portions by visually distinguishing said terrain clearance reachable portions distinguishable from portions that are infeasible to reach while maintaining said terrain clearance,
wherein the determining is calculated based on a potential ability of the aerial vehicle to climb above said portions of the terrain.

8. The method according to claim 7, wherein the visual distinguishability is achieved by a predefined visual differentiator associating a first visual parameter to locations over which the aerial vehicle can maneuver and a second visual parameter to locations over which the aerial vehicle cannot maneuver.

9. The method according to claim 7, wherein the visual indicators associated with maneuverability are confined within a flight corridor associated with the aerial vehicle.

10. The method according to claim 7, wherein the visual indicators are in a form of bars having various colors associated with a continuous level of maneuverability associated with respective locations above the terrain.

11. A system comprising:
a computer memory configured to store a 3D model representing at least a portion of a terrain located in a vicinity of an aerial vehicle;
a plurality of sensors configured to obtain real-time parameters affecting a maneuverability of the aerial vehicle; and
a computer processor configured to map said portion of the terrain into at least two types: a first type indicative of feasibility of said aerial vehicle to maneuver over the terrain while complying with predefined terrain clearance requirements, and a second type indicative of unfeasibility of said aerial vehicle to maneuver over the portion of the terrain while complying with said predefined terrain clearance requirements, wherein the computer processor is configured to map based on said real-time parameters, the 3D model, and given a predefined performance envelope of the aerial vehicle and a potential ability of the aerial vehicle to climb above the portion of the terrain.

12. The system according to claim 11, wherein the real-time parameters comprise are least one of: spatial position, orientation, speed, and acceleration.

13. The system according to claim 11, wherein the portion of the terrain is limited to a flight corridor which defines potential flight paths of the aerial vehicle.

14. The system according to claim 11, wherein the terrain comprises any object and surface defining a ground surface.

15. The system according to claim 11, wherein the computer memory stores the 3D model over time after updating the real-time parameters.

16. A system comprising:
a computer memory configured to store a 3D model representing at least a portion of a terrain located in a vicinity of an aerial vehicle;
a computer processor configured to determine portions of the terrain that are feasible to reach by the aerial vehicle, while maintaining terrain clearance, based on feasibility of the aerial vehicle to climb above said portions of the terrain that are feasible to reach; and
a display configured to present said terrain clearance portions that are feasible to reach by visually distinguishing said terrain clearance portions that are feasible to reach from portions that are infeasible to reach while maintaining terrain clearance denoting a potential ability of the aerial vehicle to climb above the portion of the terrain,
wherein the 3D model is generated by repeatedly capturing images of the terrain from various positions and generating the 3D model based on the captured images.

17. The system according to claim 16, wherein the visual distinguishability is achieved by a predefined color map associating a first color to locations over which the aerial vehicle can maneuver and a second color to locations over which the aerial vehicle cannot maneuver.

18. The system according to claim 16, wherein the visual indicators associated with maneuverability are confined within a flight corridor associated with the aerial vehicle.

19. The system according to claim 16, wherein the visual indicators are in a form of bars having various colors associated with a continuous level of maneuverability associated with respective locations above the terrain.

20. The system according to claim 16, wherein the 3D model comprises at least one of: Digital Terrain Elevation Data (DTED), and Digital Terrain Mapping (DTM).

* * * * *